US012649847B2

(12) United States Patent
Aurisicchio et al.

(10) Patent No.: US 12,649,847 B2
(45) Date of Patent: Jun. 9, 2026

(54) RUBBER COMPOSITION, RUBBER PRODUCT AND TIRE

(71) Applicant: BRIDGESTONE EUROPE NV/SA [BE/BE], Zaventem (BE)

(72) Inventors: Claudia Aurisicchio, Rome (IT); Alessandra Calzetta, Rome (IT); Raffaele Di Ronza, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 762 days.

(21) Appl. No.: 17/911,864

(22) PCT Filed: Mar. 4, 2021

(86) PCT No.: PCT/IB2021/051806

§ 371 (c)(1), (2) Date: Sep. 15, 2022

(87) PCT Pub. No.: WO2021/186280

PCT Pub. Date: Sep. 23, 2021

(65) Prior Publication Data

US 2023/0192999 A1 Jun. 22, 2023

(30) Foreign Application Priority Data

Mar. 16, 2020 (WO) .................. PCT/IB2020/052386

(51) Int. Cl.

| | |
|---|---|
| ***C08L 15/00*** | (2006.01) |
| ***B60C 1/00*** | (2006.01) |
| ***C08K 9/04*** | (2006.01) |

(52) U.S. Cl.

CPC ................ *C08L 15/00* (2013.01); *B60C 1/00* (2013.01); *C08K 9/04* (2013.01); *C08K 2201/006* (2013.01); *C08L 2312/00* (2013.01)

(58) Field of Classification Search

CPC ........ C08L 15/00; C08L 2312/00; B60C 1/00; C08K 9/04; C08K 2201/006

See application file for complete search history.

(56) References Cited

U.S. PATENT DOCUMENTS

| | | | |
|---|---|---|---|
| 6,365,668 B1 | 4/2002 | Scholl et al. | |
| 2015/0376460 A1* | 12/2015 | Grumbine ......... | H01L 21/31053 252/79.1 |
| 2016/0075809 A1* | 3/2016 | Steinhauser ............ | C08C 19/36 525/332.9 |
| 2017/0044020 A1* | 2/2017 | Boivin .................. | C01B 33/193 |

OTHER PUBLICATIONS

International Search Authority: European Patent Office International Search Report for International Patent Application No. PCT/IB2021/051806 dated May 20, 2021, 3 pages.

* cited by examiner

*Primary Examiner* — Robert S Jones, Jr.
*Assistant Examiner* — Elizabeth Amato
(74) *Attorney, Agent, or Firm* — Patterson Intellectual Property Law, PC

(57) ABSTRACT

The present invention provides rubber compositions suitable for tyre manufacture comprising a functionalised polymer and a functionalised silica.

16 Claims, No Drawings

RUBBER COMPOSITION, RUBBER PRODUCT AND TIRE

FIELD OF THE INVENTION

The present invention provides rubber compositions suitable for tire manufacture, which comprise a functionalized polymer and a functionalized silica. The present invention additionally provides rubber products and tires made from these rubber compositions.

BACKGROUND

A demand for vehicles with lower fuel consumption is growing with the global movement towards the reduction of carbon dioxide emissions. To respond to this demand, lower rolling resistance is required of tires. From the standpoint of improving automobile driving safety, it is also important to ensure grip performance on wet road surfaces (wet performance) is maximized. Wear resistance and toughness are additional factors that are important to improve in tire manufacture. Tire manufacturers may modify the components of the rubber compositions from which their tires are prepared in order to affect these properties. Functionalized polymers known in the art include those disclosed in WO 2014/173706 A1. Functionalized fillers, such as those disclosed in WO 2015/121333 A1, are additionally known.

When developing a rubber composition for a tire tread to improve the rolling resistance of the tire, it is typically effective to consider the loss tangent (tan δ) near 60° C. as an index. Specifically, using a rubber composition with a low tan δ near 60° C. in the tread rubber can suppress heat build-up in the tire to reduce the rolling resistance, thereby improving the fuel efficiency of the tire, as in JP 2012-92179 A. Similarly, JP 2014-9324 A discloses a technique for improving the wet performance in a rubber composition for tire treads. Wear resistance and toughness may also be measured by techniques known in the art. Together, the wet performance, rolling resistance and wear resistance are known as the magic triangle of viscoelastic properties. There is a desire in the art to provide tires in which all of these properties are improved.

SUMMARY OF INVENTION

The present inventors have unexpectedly discovered that by providing a rubber composition comprising a polymer functionalized with one or more carboxyl groups and a silica functionalized with one or more carboxyl groups, tires made from the rubber compositions have excellent wear resistance, rolling resistance, wet performance and toughness and outstanding balance between these properties. In particular, an interactive and/or synergistic effect is observed on the viscoelastic properties of rubber products prepared from rubber compositions comprising both a functionalized polymer and a functionalized silica.

A first aspect of the present invention provides a rubber composition comprising:

- a rubber component comprising an end-group functionalized solution-polymerised styrene-butadiene (SSBR) copolymer, wherein the end-group functionalized SSBR copolymer comprises terminal carboxyl groups; and,
- a functionalized silica, wherein the functionalized silica is a silica functionalized with one or more carboxyl groups, the functionalized silica having:
  - a BET specific surface area of from 250 to 310 $m^2/g$;
  - a CTAB specific surface area of from 230 to 285 $m^2/g$
  - a carbon content (C) of at least 0.10% by weight of the functionalized silica;
  - an object size distribution width ratio (Ld) of at least 0.91; and,
  - a pore volume distribution ratio of at least 0.65.

The end-group functionalized solution-polymerised styrene-butadiene (SSBR) copolymer may comprise terminal silane-containing carboxyl groups of the Formula (I):

(I)

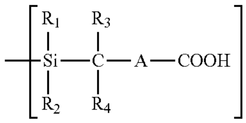

wherein:

$R_1$ and $R_2$ are the same or different and each independently a hydrogen, alkyl, alkoxy, cycloalkyl, cycloalkoxy, aryl, aryloxy, alkylaryl, alkylaryloxy, aralkyl, or aralkoxy radical, which may contain one or more heteroatoms, preferably wherein the heteroatoms are one or more selected from the group consisting of O, N, S, and Si;

$R_3$ and $R_4$ are the same or different and each independently a hydrogen, alkyl, cycloalkyl, aryl, alkaryl, or aralkyl radical, which may contain one or more heteroatoms, preferably wherein the heteroatoms are one or more selected from the group consisting of O, N, S, and Si; and, A is a divalent organic radical, which may be an alkyl radical; one or more heteroatoms selected from the group consisting of O, $NR_7$, S and $SiR_8R_9$; or, an alkyl radical containing one or more heteroatoms, preferably wherein the heteroatoms are one or more selected from the group consisting of O, $NR_7$, S, and $SiR_8R_9$.

The silane-containing carboxyl group may be present as a carboxylate of the Formula (II):

(II)

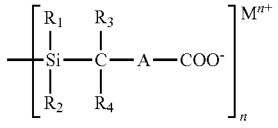

wherein:

$R_1$ and $R_2$ are as defined above for Formula (I);

$R_3$ and $R_4$ are as defined above for Formula (I); and,

A is as defined above for Formula (I); and,

M is a metal or semi-metal of valency 1 to 4, preferably Li, Na, K, Mg, Ca, Zn, Fe, Co, Ni, Al, Nd, Ti, Sn, Si, Zr, V, Mo or W.

n is an integer from 1 to 4.

The end-group functionalized SSBR copolymer may be obtainable by reaction of an SSBR copolymer with one or more functionalising reagents in the form of silalactones. For example, the silalactones may be compounds of the Formula (III):

(III)

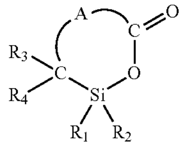

wherein $R_1$ and $R_2$ are as defined above for Formula (I);

$R_3$ and $R_4$ are as defined above for Formula (I); and,

A is as defined above for Formula (I).

The silane-containing carboxyl group may be bonded to the SSBR copolymer via one or more divalent structural elements of the Formula (V):

(V)

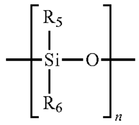

wherein n is an integer from 3 to 6;

$R_5$, $R_6$ are the same or different and are each independently a hydrogen, alkyl, cycloalkyl, aryl, alkaryl, or aralkyl radical;

which may contain one or more heteroatoms, preferably wherein the heteroatoms are one or more selected from the group consisting of O, N, S or Si.

The divalent structural elements of Formula (V) may be derived from cyclosiloxanes. For example, from cyclosiloxanes of the Formula (IV):

(IV)

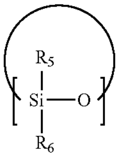

wherein n is an integer from 3 to 6;

$R_5$, $R_6$ are the same or different and are each independently a hydrogen, alkyl, cycloalkyl, aryl, alkaryl, or aralkyl radical;

which may contain one or more heteroatoms, preferably wherein the heteroatoms are one or more selected from the group consisting of O, N, S or Si, more preferably wherein the divalent structural elements of Formula (V) may be derived from one or more cyclosiloxanes selected from the group consisting of hexamethylcyclotrisiloxane, octamethylcyclotetrasiloxane, decamethylcyclopentasiloxane and dodecamethylcyclohexasiloxane.

The functionalized silica may comprise a silica functionalized at its surface with one or more carboxyl groups. The carboxyl groups may be present as carboxylic acids and/or as a carboxylate salts.

The carboxyl groups of the functionalized silica may be derived from one or more carboxylic acids, for example one or more polycarboxylic acids. The one or more polycarboxylic acids may contain two, three, four, or more than four carboxyl groups. Preferably, the one or more polycarboxylic acids may be one or more selected from the group consisting of adipic acid, succinic acid, ethylsuccinic acid, glutaric acid, methylglutaric acid, oxalic acid, and citric acid.

The carboxyl groups of the functionalized silica may be derived by reacting a silica with the one or more carboxylic acids to form the functionalized silica.

The functionalized silica has a Brunauer-Emmett-Teller (BET) specific surface area of from 250 to 310 $m^2/g$. The Brunauer-Emmett-Teller (BET) specific surface area may preferably be from 270 to 300 $m^2/g$, more preferably from 280 to 290 $m^2/g$.

The functionalized silica has a surface area by cetyltrimethylammonium bromide (CTAB) adsorption of 230 $m^2/g$ to 285 $m^2/g$. The surface area by cetyltrimethylammonium bromide (CTAB) adsorption may preferably be from 240 $m^2/g$ to 270 $m^2/g$, more preferably 245 $m^2/g$ to 265 $m^2/g$, more preferably from 250 $m^2/g$ to 260 $m^2/g$.

The functionalized silica has a carbon content of at least 0.10% by weight of the functionalized silica. The carbon content may preferably be at least 0.15% by weight, more preferably at least 0.20% by weight, more preferably at least 0.25% by weight, more preferably at least 0.30% by weight of the functionalized silica.

The functionalized silica has an object size distribution width ratio Ld of at least 0.91. The object size distribution width ratio Ld is preferably at least 0.94.

The functionalized silica has a pore volume distribution ratio of at least 0.65. The pore volume distribution is preferably at least 0.66, more preferably at least 0.68

The functionalized silica may have a pH of from 2.5 to 7, preferably from 2.5 to 5, more preferably from 3 to 4.5.

The ratio of the amount of the functionalized silica in parts by weight based on 100 parts by weight of the rubber component to the amount of the end-group functionalized SSBR copolymer in parts by weight based on 100 parts by weight of the rubber component may be from 0.5:1 to 2:1, preferably from 0.75:1 to 1.50:1, preferably from 0.9:1 to 1.40:1, more preferably from 0.95:1 to 1.30:1.

The rubber composition may comprise:

10.5 to 100 parts by weight based on 100 parts by weight of the rubber component of the end-group functionalized SSBR copolymer; and, 20 to 200 parts by weight based on 100 parts by weight of the rubber component of the functionalized silica.

The rubber composition may preferably comprise:

40 to 90 parts by weight based on 100 parts by weight of the rubber component of the end-group functionalized SSBR copolymer; and, 50 to 100 parts by weight based on 100 parts by weight of the rubber component of the functionalized silica.

The rubber composition may preferably comprise:

50 to 80 parts by weight based on 100 parts by weight of the rubber component of the end-group functionalized SSBR copolymer; and, 65 to 85 parts by weight based on 100 parts by weight of the rubber component of the functionalized silica.

The rubber composition may preferably comprise:

55 to 75 parts by weight based on 100 parts by weight of the rubber component of the end-group functionalized SSBR copolymer; and, 70 to 75 parts by weight based on 100 parts by weight of the rubber component of the functionalized silica.

In a particular embodiment, the rubber composition may comprise:

60 parts by weight based on 100 parts by weight of the rubber component of the end-group functionalized SSBR copolymer; and, 72 parts by weight based on 100 parts by weight of the rubber component of the functionalized silica.

In a particular embodiment, the rubber composition may comprise:

70 parts by weight based on 100 parts by weight of the rubber component of the end-group functionalized SSBR copolymer; and, 72 parts by weight based on 100 parts by weight of the rubber component of the functionalized silica.

In a particular embodiment, the rubber composition may comprise:

70 parts by weight based on 100 parts by weight of the rubber component of the end-group functionalized SSBR copolymer; and, 80 parts by weight based on 100 parts by weight of the rubber component of the functionalized silica.

The rubber composition of the present invention may be compounded.

A second aspect of the present invention relates to a rubber product comprising the rubber composition of the present invention, wherein the rubber composition is vulcanised.

A third aspect of the present invention relates to a tire comprising the rubber composition of the present invention or the rubber product of the present invention.

DETAILED DESCRIPTION

According to an aspect, the present invention provides a rubber composition comprising:

a rubber component comprising an end-group functionalized solution-polymerised styrene-butadiene (SSBR) copolymer, wherein the end group functionalized SSBR copolymer comprises terminal carboxyl groups; and, a functionalized silica, wherein the functionalized silica is a silica functionalized with one or more carboxyl groups, the functionalized silica having:

a BET specific surface area of between 250 and 310 $m^2/g$;

a CTAB specific surface area of between 230 and 285 $m^2/g$ a carbon content of at least 0.10% by weight of the functionalized silica;

an object size distribution width ratio Ld of at least 0.91; and, a pore volume distribution ratio of least 0.65.

The rubber compositions of the present invention offer a number of advantages compared to rubber compositions known in the art. In particular, tires produced from rubber compositions of the present invention have excellent wet performance, rolling resistance, wear resistance and toughness and outstanding balance between these properties. The combination of the end-group functionalized SSBR copolymer and the functionalized silica has an interactive and/or synergistic impact on the properties of the rubber compositions and gives rise to the advantageous properties of tires discussed above. Specifically, an interaction between the end-group functionalized SSBR copolymer and functionalized silica, which may be synergistic, leads to an unprecedented level of dispersion of the fillers (in particular, the functionalized silica filler) in the rubber compositions and rubber products of the present invention. This unprecedented dispersion has a positive impact on each of the wet performance, rolling resistance, wear resistance and toughness of tires produced from the rubber compositions and provides an outstanding balance between these properties.

The End-Group Functionalized Solution-Polymerised Styrene-Butadiene (SSBR) Copolymer The end-group functionalized SSBR copolymer may comprise an SSBR copolymer terminated by silane-containing carboxyl groups of the Formula (I):

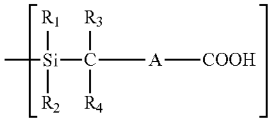

(I)

wherein:

$R_1$ and $R_2$ are the same or different and each independently a hydrogen, alkyl, alkoxy, cycloalkyl, cycloalkoxy, aryl, aryloxy, alkylaryl, alkylaryloxy, aralkyl, or aralkoxy radical, which may contain one or more heteroatoms, preferably wherein the heteroatoms are one or more selected from the group consisting of O, N, S, and Si;

$R_3$ and $R_4$ are the same or different and each independently a hydrogen, alkyl, cycloalkyl, aryl, alkaryl, or aralkyl radical, which may contain one or more heteroatoms, preferably wherein the heteroatoms are one or more selected from the group consisting of O, N, S, and Si; and, A is a divalent organic radical, which may be an alkyl radical; one or more heteroatoms selected from the group consisting of O, $NR_7$, S and $SiR_8R_9$; or, an alkyl radical containing one or more heteroatoms, preferably wherein the heteroatoms are one or more selected from the group consisting of O, $NR_7$, S, and $SiR_8R_9$.

The end-group functionalized SSBR copolymer may comprise an SSBR copolymer terminated by a silane-containing carboxyl group of the Formula (I), wherein $R_1$ and $R_2$ are each independently a hydrogen, $C_1$ to $C_{12}$ linear or branched alkyl, $C_2$ to $C_{12}$ linear or branched alkenyl, $C_1$ to $C_{12}$ linear or branched alkoxy, $C_3$ to $C_{12}$ cycloalkyl, $C_2$ to $C_{12}$ cycloalkoxy, $C_6$ to $C_{12}$ aryl, $C_6$ to $C_{12}$ aryloxy, $C_7$ to $C_{14}$ arylalkyl, $C_7$ to $C_{14}$ alkylaryl, $C_6$ to $C_{24}$ alkylaryloxy, $C_5$ to $C_{24}$ aralkyl, or a $C_6$ to $C_{24}$ aralkoxy radical. Preferably, $R_1$ and $R_2$ may each independently be a $C_1$ to $C_6$ linear or branched alkyl, $C_2$ to $C_6$ linear or branched alkenyl, $C_1$ to $C_6$ linear or branched alkoxy, $C_3$ to $C_{12}$ cycloalkyl, $C_2$ to $C_{12}$ cycloalkoxy, or a $C_6$ to $C_{12}$ aryl radical. Preferably, $R_1$ and $R_2$ may each independently be a $C_1$ to $C_6$ linear or branched alkyl, $C_2$ to $C_6$ linear or branched alkenyl, $C_1$ to $C_6$ linear or branched alkoxy, or a $C_6$ to $C_{12}$ aryl radical. Preferably, $R_1$ and $R_2$ may each independently be a $C_1$ to $C_3$ linear or branched alkyl, $C_2$ to $C_3$ linear or branched alkenyl, $C_1$ to $C_3$ linear or branched alkoxy, or a $C_6$ aryl radical. For example, $R_1$ and $R_2$ may each independently be a methyl, tert-butyl, prop-1-enyl, ethoxy, or phenyl radical. More preferably, $R_1$ and $R_2$ are methyl radicals.

$R_3$ and $R_4$ may each independently be a hydrogen, $C_1$ to $C_{12}$ linear or branched alkyl, $C_3$ to $C_{12}$ cycloalkyl, $C_6$ to $C_{12}$ aryl, $C_5$ to $C_{24}$ aralkyl, or a $C_5$ to $C_{24}$ alkaryl radical. Preferably $R_3$ and $R_4$ may each independently be a hydrogen, $C_1$ to $C_6$ linear or branched alkyl, $C_2$ to $C_6$ linear or branched alkenyl, $C_1$ to $C_6$ linear or branched alkoxy, or a $C_6$ to $C_{12}$ aryl radical. More preferably, $R_3$ and $R_4$ may each independently be a hydrogen or methyl radical. In a particular embodiment, $R_3$/$R_4$ and A together form a $C_6$ aryl.

A may independently be a substituted or unsubstituted $C_1$ to $C_6$ linear alkyl radical; one or more heteroatoms selected from the group consisting of O, $NR_7$, S and $SiR_8R_9$; or, a substituted or unsubstituted $C_1$ to $C_6$ linear alkyl radical containing one or more heteroatoms selected from the group consisting of O, $NR_7$, S, and $SiR_8R_9$. Preferably, A may independently be a substituted or unsubstituted $C_1$ to $C_3$ linear alkyl radical; one or more heteroatoms selected from the group consisting of O, $NR_7$, S and $SiR_8R_9$; or, a substituted or unsubstituted $C_1$ to $C_3$ linear alkyl radical containing one or more heteroatoms selected from the group consisting of O, $NR_7$, S, and $SiR_8R_9$. Where A is substituted, it may be substituted with one or more selected from the group consisting of a $C_1$ to $C_6$ linear alkyl radical, and a $C_6$ to $C_{12}$ aryl radical. Preferably, A may be substituted with a $C_1$ to $C_3$ linear alkyl radical or a $C_6$ aryl radical. More preferably, A may be substituted with a $C_1$ radical. $R_7$ may be hydrogen, $C_1$ to $C_6$ linear alkyl, for example methyl, or trimethylsilyl. $R_8$ and $R_9$ may independently be $C_1$ to $C_6$ linear alkyl, for example methyl. Preferably, A is a $C_2$ alkyl radical containing an S atom. The structure of A as a $C_2$ alkyl radical containing an S atom is presented below.

A

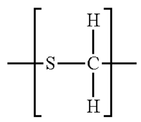

The silane-containing carboxyl group may be present as a carboxylate of the Formula (II):

(II)

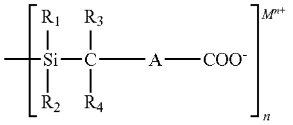

wherein:

$R_1$ and $R_2$ are as defined above for Formula (I);

$R_3$ and $R_4$ are as defined above for Formula (I); and,

A is as defined above for Formula (I); and,

M is a metal or semi-metal of valency 1 to 4, for example, Li, Na, K, Mg, Ca, Zn, Fe, Co, Ni, Al, Nd, Ti, Sn, Si, Zr, V, Mo or W.

n is an integer from 1 to 4.

In the compounds of Formula (II), M may be Li and n may be 1.

The further definitions of $R_1$, $R_2$, $R_3$, $R_4$, $R_7$, $R_8$ and $R_9$ in Formula (II) are the same as those above for Formula (I).

The end-group functionalized SSBR copolymer may be obtainable by reaction of the SSBR copolymer with one or more functionalizing reagents in the form of silalactones. The silalactones may be compounds of the Formula (III)

(III)

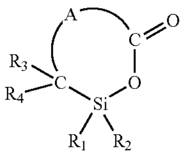

wherein $R_1$ and $R_2$ are as defined above for Formula (I);

$R_3$ and $R_4$ are as defined above for Formula (I); and,

A is as defined above for Formula (I).

The further definitions of $R_1$, $R_2$, $R_3$, $R_4$, $R_7$, $R_8$ and $R_9$ in Formula (III) are as described above for Formula (I).

Advantageously, the silalactones of Formula (III) may be one or more selected from the group consisting of 2,2-dimethyl-1-oxa-2-silacyclohexan-6-one, 2,2,4-trimethyl-1-oxa-2-silacyclohexan-6-one, 2,2,5-trimethyl-1-oxa-2-silacyclohexan-6-one, 2,2,4,5-tetramethyl-1-oxa-2-silacyclohexan-6-one, 2,2-diethyl-1-oxa-2-silacyclohexan-8-one, 2,2-diethoxy-1-oxa-2-silacyclohexan-6-one, 2,2-dimethyl-1,4-dioxa-2-silacyclohexan-6-one, 2,2,5-trimethyl-1,4-dioxa-2-silacyclohexan-6-one, 2,2,3,3-tetramethyl-1,4-dioxa-2-silacyclohexan-6-one, 2,2-dimethyl-1-oxa-4-thia-2-silacyclohexan-6-one, 2,2-diethyl-1-oxa-4-thia-2-silacyclohexan-6-one, 2,2-diphenyl-1-oxa-4-thia-2-silacyclonexan-6-one, 2-methyl-2-ethenyl-1-oxa-4-thia-2-silacyclohexan-6-one, 2,2,5-trimethyl-1-oxa-4-thia-2-silacyclohexan-6-one, 2,2-dimethyl-1-oxa-4-aza-2-silacyclohexan-6-one, 2,2,4-trimethyl-1-oxa-4-aza-2-silacyclohexan-6-one, 2,4-dimethyl-2-phenyl-1-oxa-4-aza-2-silacyclohexan-6-one, 2,2-dimethyl-4-trimethylsilyl-1-oxa-4-aza-2-silacyclohexan-8-one, 2,2-diethoxy-4-methyl-1-oxa-4-aza-2-silacyclohexan-6-one, 2,2,4,4-tetramethyl-1-oxa-2,4-disilacyclohexan-8-one, 3,4-dihydro-3,3-dimethyl-1H-2,3-benzoxasilin-1-one, 2,2-dimethyl-1-oxa-2-silacyclopentan-5-one, 2,2,3-trimethyl-1-oxa-2-silacyclopenten-5-one, 2,2-dimethyl-4-phenyl-1-oxa-2-silacyclopentan-5-one, 2,2,4-(tert-butyl)-1-oxa-2-silacyclopentan-5-one, 2-methyl-2-(2-propen-1-yl)-1-oxa-2-silacyclopentan-5-one, 1,1-dimethyl-2,1-benzoxasilol-3(1H)-one, 2,2-dimethyl-1-oxa-2-silacycloheptan-7-one. Preferably, the silalactone of Formula (III) is 2,2-dimethyl-1-oxa-4-thia-2-silacyclohexan-6-one. The structure of 2,2-dimethyl-1-oxa-4-thia-2-silacyclohexan-6-one is presented below.

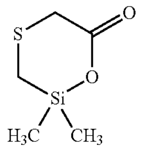

The silane-containing carboxyl group may be bonded to the SSBR copolymer via one or more divalent structural elements of the Formula (V):

(V)

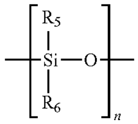

wherein n is an integer from 3 to 6;

$R_5$, $R_6$ are the same or different and are each independently a hydrogen, alkyl, cycloalkyl, aryl, alkaryl, or aralkyl radical;

which may contain one or more heteroatoms, preferably wherein the heteroatoms are one or more selected from the group consisting of O, N, S or Si When the divalent structural element is present, the SSBR copolymer is bonded at the silicon end of the divalent structural element according to the below:

(V)

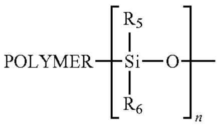

The silane-containing carboxyl group of Formula (I) or (II) is bonded at the oxygen end of the divalent structural element of Formula (V), when the divalent structural element is present.

The divalent structural elements of the Formula (V) may be derived from cyclosiloxanes, such as cyclosiloxanes of the Formula (IV):

(IV)

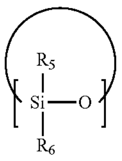

wherein n is as defined above for Formula (V);

$R_5$, $R_6$ are as defined above for Formula (V).

$R_5$ and $R_6$ may each independently a hydrogen, $C_1$ to $C_{12}$ linear or branched alkyl, $C_3$ to $C_{12}$ cycloalkyl, $C_6$ to $C_{12}$ aryl, $C_7$ to $C_{14}$ aralkyl, or a $C_7$ to $C_{14}$ alkaryl radical. Preferably, $R_5$ and $R_6$ may each independently be a $C_1$ to $C_6$ linear or branched alkyl, preferably, $C_1$ to $C_3$ linear alkyl, more preferably a methyl radical.

The divalent structural elements of the Formula (V) may be derived from one or more selected from the group consisting of hexamethylcyclotrisiloxane, octamethylcyclotetrasiloxane, decamethylcyclopentasiloxane and dodecamethylcyclohexasiloxane. Preferably, the divalent structural element is derived from hexamethylcyclotrisiloxane.

It is particularly advantageous for the end-group functionalized SSBR copolymer to be terminated with silane-containing carboxyl groups derived from 2,2-dimethyl-1-oxa-4-thia-2-silacyclohexan-6-one that is bonded to the polymer via a divalent structural element derived from hexamethylcyclotrisiloxane.

The end-group functionalized SSBR copolymer may have a styrene content of from 10% to 30% by weight of the end-group functionalized SSBR copolymer, preferably 15% to 25% by weight, more preferably 20% to 22% by weight, for example 20%, 21%, or 22% by weight. The end-group functionalized SSBR copolymer may have a vinyl content of 50% to 75% by weight of the end-group functionalized SSBR copolymer, preferably, 50% to 65%, more preferably 60% to 65%, for example 60%, 61%, 62%, 63%, 64%, or 65% by weight of the end-group functionalized SSBR copolymer.

The end-group functionalized SSBR copolymer may have mean molar masses (number-average, Mn) of 10,000 to 2,000,000 g/mol, preferably 100,000 to 1,000,000 g/mol.

The end-group functionalized SSBR copolymer may have a glass transition temperatures of −110° C. to +20° C., preferably −60° C. to 0° C., preferably −40° C. to −10° C., preferably −30° C. to −15° C., more preferably −22° C. to −26° C., for example −22° C., −23° C., −24° C., −25° C., or −26° C.

The end-group functionalized SSBR copolymer may have a Mooney viscosity [ML 1+4 (100° C.)] of 10 to 200 Mooney units, for example 30 to 150 Mooney units, 40 to 90 Mooney units, 50 to 60 Mooney units, for example 50, 51, 52, 53, 54, 55, 56, 57, 58, 59, 60 Mooney units.

The end-group functionalized SSBR copolymer may be extended with an extender oil such that the extended end-group functionalized SSBR copolymer comprises from 1% to 10% extender oil, preferably 2.5% to 7.5%, more preferably 5% extender oil. The extender oil may be one or more selected from the group consisting of DAE (Distillate Aromatic Extract), Tdae (Treated Distillate Aromatic Extract), MES (Mild extraction solvate), RAE (Residual Aromatic Extract), Trae (Treated Residual Aromatic Extract), naphthenic oil, heavy naphthenic oils, paraffin oils, vegetable oils such as coconut oil, synthetic oils such as alkylbenzene oils and castor oils. Preferably, the end-group functionalized SSBR copolymer is extended with an aromatic oil, such as Treated Distillate Aromatic Extract oil (Tdae) such that the extended end-group functionalized SSBR copolymer comprises 5% Treated Distillate Aromatic Extract oil.

The synthesis of SSBR copolymers terminated with carboxyl groups and the compounds of Formulae (I) to (V) above is discussed in detail in, for example, International patent application number WO 2014/173706 A1.

The Functionalized Silica

The functionalized silica is a silica functionalized with one or more carboxyl groups, the functionalized silica having:

a BET specific surface area of between 250 and 310 $m^2/g$;

a CTAB specific surface area of between 230 and 285 $m^2/g$ a carbon content of at least 0.10% by weight of the functionalized silica;

an object size distribution width ratio Ld of at least 0.91; and, a pore volume distribution ratio of at least 0.65.

The synthesis of the functionalized silicas is discussed in detail in International patent application number WO 2015/121333 A1. However, generally, the preparation of functionalized silica is performed by a precipitation reaction of a silicate, such as an alkali metal silicate (for example sodium silicate), with an acidifying agent (for example sulfuric acid), then separation by filtration, with production of a filter cake of the precipitated silica obtained, followed by liquefaction said filter cake and, finally, drying (generally by atomization). The silica can be precipitated in any mode: in particular, addition of acidifying agent to a silicate feedstock or total or partial simultaneous addition of acidifying agent and of silicate to a feedstock of water or of silicate. One or more polycarboxylic acids are added to the filter cake, either during the liquefaction operation, or after the liquefaction operation and before the drying step.

The functionalized silica may comprise a silica functionalized at its surface with one or more carboxyl groups. The carboxyl groups may be present as carboxylic acids and/or as a carboxylate salts. The carboxyl groups may comprise a polycarboxylic acid containing two, three, four or more than four carboxylic acid functional groups. The polycarboxylic acid may be a dicarboxylic acid or tricarboxylic acid. The polycarboxylic acid may be a linear or branched, saturated or unsaturated, aliphatic polycarboxylic acid containing from 2 to 20 carbon atoms or an aromatic polycarboxylic acid. The polycarboxylic acid may comprise hydroxyl groups and/or halogen atoms. The aliphatic polycarboxylic acid may comprise heteroatoms on the main chain, for example N or S. The polycarboxylic acid may be one or more selected from the group consisting of linear, branched, saturated, unsaturated, aliphatic polycarboxylic acids containing from 2 to 16 carbon atoms and aromatic polycarboxylic acids.

The aliphatic polycarboxylic acids may be made of linear, saturated or unsaturated polycarboxylic acids containing from 2 to 14 carbon atoms, for example from 2 to 12 carbon atoms. The polycarboxylic acid may contain 2, 3, 4, 5, 6, 7, 8, 9, 10, 11 or 12 carbon atoms. Advantageously, the polycarboxylic acid may contain 4, 5, 6, 7, 8, 9 or 10 carbon atoms, for example 4, 5, 6, 7 or 8 carbon atoms. The polycarboxylic acid may contain 4, 5 or 6 carbon atoms.

The polycarboxylic acid may be one or more selected from the group consisting of oxalic acid, malonic acid, tricarballylic acid, succinic acid, glutaric acid, adipic acid, pimelic acid, suberic acid, azelaic acid, sebacic acid, methylsuccinic acid, ethylsuccinic acid, methyladipic acid, methylglutaric acid, dimethylglutaric acid, malic acid, citric acid, isocitric acid and tartaric acid. Preferably, the polycarboxylic acid is one or more selected from the group consisting of adipic acid, succinic acid, ethylsuccinic acid, glutaric acid, methylglutaric acid, oxalic acid, and citric acid.

The functionalized silica has a Brunauer-Emmett-Teller (BET) specific surface area of from 250 to 310 $m^2/g$. The Brunauer-Emmett-Teller (BET) specific surface area is preferably from 270 to 300 $m^2/g$, more preferably 280 to 290 $m^2/g$, for example 280, 281, 282, 283, 284, 285, 286, 287, 288, 289, or 290 $m^2/g$.

The functionalized silica has a surface area by cetyltrimethylammonium bromide (CTAB) adsorption of from 230 $m^2/g$ to 285 $m^2/g$. The surface area by cetyltrimethylammonium bromide (CTAB) adsorption may preferably be from 240 $m^2/g$ to 270 $m^2/g$, more preferably from 245 $m^2/g$ to 265 $m^2/g$, more preferably from 250 $m^2/g$ to 260 $m^2/g$, for example, 250, 251, 252, 253, 254, 255, 256, 257, 258, 259, or 260 $m^2/g$.

The functionalized silica may have a pH of from 2.5 to 7, preferably from 2.5 to 5, more preferably from 3 to 4.5, for example, 3.0, 3.1, 3.2, 3.3, 3.4, 3.5, 3.6, 3.7, 3.8, 3.9, 4.0, 4.1, 4.2, 4.3, 4.4, or 4.5.

The functionalized silica has a carbon content of at least 0.10% by weight of the functionalized silica. The carbon content (denoted (C)) is the carbon content of carboxylic acid plus corresponding carboxylate, expressed as total carbon. The carbon content may preferably be at least 0.15% by weight, more preferably at least 0.20% by weight, more preferably at least 0.25% by weight, more preferably at least 0.30% by weight of the functionalized silica. The functionalized silica has an object size distribution width ratio Ld of at least 0.91. The object size distribution width ratio Ld is preferably at least 0.94. As used herein, object size distribution width ratio is the object size distribution width ratio (Ld), measured by X-Ray Disc Centrifuge (XDC) particle size analysis, after ultrasound deagglomeration (in water), and corresponds to the ratio (d84−d16)/d50, in which dn is the size for which n % of particles (by mass) are smaller than this size (the distribution width Ld is thus calculated on the cumulative particle size curve, taken in its entirety). The size distribution width Ld of objects smaller than 500 nm, measured by XDC particle size analysis, after ultrasound deagglomeration (in water), corresponds to the ratio (d84−d16)/d50 in which dn is the size for which n % of particles (by mass), relative to the particles smaller than 500 nm, are smaller than this size (the distribution width Ld is thus calculated on the cumulative particle size curve, truncated above 500 nm). Object size distribution width as used herein is measured according to the method described in WO 2015/121333 A1.

The functionalized silica has a pore volume distribution ratio of at least 0.65. The pore volume distribution is preferably at least 0.66, more preferably at least 0.68. Pore volumes and pore diameters are measured by mercury (Hg) porosimetry using a Micromeritics Autopore 9520 porosimeter and are calculated by the Washburn relationship with a contact angle theta equal to 140° and a gamma surface tension equal to 484 dynes/cm (standard DIN 66133). The preparation of each sample is performed as follows: each sample is predried in an oven at 200° C. for 2 hours. As used herein, pore volume distribution ratio is the pore volume distribution such that the ratio V(d5−d50)/V(d5−d100) is at least 0.65, preferably at least 0.66, more preferably at least 0.68. V(d5−d50) represents the pore volume consisting of pores between d5 and d50 in diameter, and V(d5−d100) represents the pore volume consisting of pores between d5 and d100 in diameter, dn being here the pore diameter for which n % of the total surface area of all the pores is provided by the pores with a diameter greater than this diameter (the total surface area of the pores ($S_0$) may be determined from the mercury intrusion curve). Pore volume distribution ratio as used herein is measured according to the method described in WO 2015/121333 A1.

The amount of the end-group functionalized SSBR copolymer and the functionalized silica and the amounts of these two components relative to each other in the rubber compositions can have an advantageous effect on the properties of the rubber compositions of the present invention and tires made therefrom.

The amount of the end-group functionalized SSBR copolymer may be from 10.5 to 100 by weight based on 100 parts by weight of the rubber component, preferably, 40 to 90 parts by weight, preferably 50 to 80 parts by weight, more preferably 55 to 75 parts by weight, for example 55, 56, 57, 58, 59, 60, 61, 62, 63, 64, 65, 66, 67, 68, 69, 70, 71, 72, 73, 74, 75 parts by weight based on 100 parts by weight of the rubber component. In specific examples, the amount of the end-group functionalized SSBR copolymer may be 60 parts by weight or 70 parts by weight based on 100 parts by weight of the rubber component.

The amount of the functionalized silica may be from 20 to 200 parts by weight based on 100 parts by weight of the rubber component, preferably 50 to 100 parts by weight, preferably 65 to 85 parts by weight, more preferably 70 to 75 parts by weight, for example, 70, 71, 72, 73, 74, 75 parts by weight based on 100 parts by weight of the rubber component. In specific examples, the amount of the functionalized silica may be 72 parts by weight based on 100 parts by weight of the rubber component.

As mentioned above, the amounts of the end-group functionalized SSBR copolymer and the functionalized silica relative to each other in the rubber compositions can have an advantageous effect on the properties of the rubber compositions and tires made therefrom. The ratio of the amount of the functionalized silica to the end-group functionalized SSBR copolymer in parts by weight based on 100 parts by weight of the rubber component may be from 0.5:1 to 2:1, preferably from 0.75:1 to 1.50:1, preferably from 0.9:1 to 1.40:1, more preferably from 0.95:1 to 1.30:1 for example 0.95, 0.96, 0.97, 0.98, 0.99, 1.00, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, 1.20, 1.21, 1.22, 1.23, 1.24, 1.25, 1.26, 1.27, 1.28, 1.29, or 1.30:1. Tires produced from rubber compositions having these relative amounts of the functionalized silica and end-group functionalized SSBR copolymer have excellent wet performance, rolling resistance, wear resistance and toughness and improved balance between these properties compared to compositions where either or both of the end-group functionalized SSBR copolymer and functionalized silica are absent.

When the amount of the functionalized silica in parts by weight based on 100 parts by weight of the rubber component is greater than the amount of the end-group functionalized SSBR copolymer in parts by weight based on 100 parts by weight of the rubber component, tires produced from the rubber compositions exhibit particularly improved wear resistance as well as excellent rolling resistance, wet performance and toughness and outstanding balance between these properties when compared to tires produced from compositions where the relative amounts of these components is different or compared to compositions where either or both of the end-group functionalized SSBR copolymer and functionalized silica are absent. In other words, these improved properties are achieved when the ratio of the amount of the functionalized silica to the end-group functionalized SSBR copolymer in parts by weight based on 100 parts by weight of the rubber component is greater than 1:1, preferably, 1.01:1 to 1.50:1, 1.01:1 to 1.40:1, or 1.01:1 to 1.30:1, for example 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, 1.20, 1.21, 1.22, 1.23, 1.24, 1.25, 1.26, 1.27, 1.28, 1.29, or 1.30:1.

According to a further aspect, the present invention provides a rubber composition comprising:

58 to 73 parts by weight based on 100 parts by weight of the rubber component of a functionalized polymer, wherein the functionalized polymer is a polymer functionalized with one or more carboxyl groups; and, 70 to 75 parts by weight based on 100 parts by weight of the rubber component of a functionalized silica, wherein the functionalized silica is a silica functionalized with one or more carboxyl groups, the functionalized silica having:

a BET specific surface area of from 250 to 310 $m^2/g$;

a CTAB specific surface area of from 230 to 285 $m^2/g$ a carbon content of at least 0.10% by weight of the functionalized silica;

an object size distribution width ratio (Ld) of at least 0.91; and, a pore volume distribution ratio of at least 0.65;

wherein the ratio of the amount of the functionalized silica to the amount of the functionalized polymer in parts by weight based on 100 parts by weight of the rubber component is 1.01:1 to 1.30:1; and, wherein the pH of the functionalized silica is from 3.5 to 4.5.

It has additionally been discovered that higher amounts of the functionalized silica can, in particular, improve the wear resistance properties of tires produced from rubber compositions of the present invention. For example, tires made from rubber compositions comprising the functionalized silica in an amount of 75 or more parts by weight, for example, 75 to 200 parts by weight, 75 to 150 parts by weight, 75 to 100 parts by weight, or 75 to 85 parts by weight, for example 80 parts by weight, based on 100 parts by weight of the rubber component have outstanding wear resistance properties. In particular, including the higher amounts of the functionalized silica discussed above in rubber compositions wherein the amount of the functionalized silica is greater than the amount of the end-group functionalized SSBR copolymer as discussed above results in extremely good wear resistance properties.

The present invention additionally provides a rubber composition comprising:

68 to 72 parts by weight based on 100 parts by weight of the rubber component of an end-group functionalized solution-polymerised styrene-butadiene (SSBR) copolymer, wherein the end group comprises one or more carboxyl groups; and, 77.5 to 82.5 parts by weight based on 100 parts by weight of the rubber component of a functionalized silica, wherein the functionalized silica is a silica functionalized with one or more carboxyl groups, the functionalized silica having:

a BET specific surface area of from 250 to 310 $m^2/g$;

a CTAB specific surface area of from 230 to 285 $m^2/g$ a carbon content of at least 0.10% by weight of the functionalized silica;

an object size distribution width ratio (Ld) of at least 0.91; and, a pore volume distribution ratio of at least 0.65;

wherein the ratio of the amount of the functionalized silica to the amount of the end-group functionalized SSBR copolymer in parts by weight based on 100 parts by weight of the rubber component is 1.01:1 to 1.15:1; and, wherein the pH of the functionalized silica is from 3 to 4.5.

Further Components

In addition to the end-group functionalized SSBR copolymer and functionalized silica, the rubber compositions of the present invention may contain further components. These further components may include one or more selected from the group consisting of additional polymers (which are different to the end-group functionalized SSBR copolymers discussed above), vulcanising agents, vulcanisation accelerators, vulcanisation accelerator auxiliaries, fillers, silane coupling agents, antidegradation agents, such as antioxidants or antiozonants, waxes, and oils. For example, the compositions of the present invention may further comprise an additional polymer, a vulcanising agent, a vulcanising accelerator, a vulcanisation accelerator auxiliary, a carbon black, a silane coupling agent, an antidegradant, a wax, and an oil.

The additional polymer of the rubber compositions is not particularly limited (other than in that it is different to the end-group functionalized SSBR copolymers discussed above) and may be any of those known to the person skilled in the art. The additional polymer may comprise a diene polymer and/or a diene copolymer obtainable by copolymerisation of diene monomers with vinylaromatic monomers. For example, the additional polymer may comprise one or more selected from the group consisting of polybutadiene, polyisoprene, butadiene-isoprene copolymer, styrene-butadiene copolymer, isoprene-styrene copolymer, or butadiene-isoprene-styrene terpolymer. Preferably, the additional polymer is a solution-polymerised styrene-butadiene copolymer, for example BUNA® VSL 3038-2HM by Arlanxeo. The additional polymer may be oil-extended. The extender oil may be one or more selected from the group consisting of DAE (Distillate Aromatic Extract), Tdae (Treated Distillate Aromatic Extract), MES (Mild extraction solvate), RAE (Residual Aromatic Extract), Trae (Treated Residual Aromatic Extract), naphthenic oil, heavy naphthenic oils, paraffin oils, vegetable oils such as coconut oil, synthetic oils such as alkylbenzene oils and castor oils. Preferably, the extender oil is an aromatic oil, such as Treated Distillate Aromatic Extract (Tdae). The amount of oil present in the additional polymer may vary from 20% to 40% of the total quantity of the oil extended additional polymer, for example 27.3%. The amount of the additional polymer is not particularly limited, but may be from 0 to 89.5 parts by weight based on 100 parts by weight of the rubber component, preferably 10 to 60 parts by weight, preferably 20 to 50 parts by weight, more preferably 25 to 45 parts by weight, for example 25, 26, 27, 28, 29, 30, 31, 32, 33, 34, 35, 36, 37, 38, 39, 40, 41, 42, 43, 44 or 45, parts by weight based on 100 parts by weight of the rubber component.

The vulcanising agent of the rubber compositions of present invention is not particularly limited and may be any of those known to the person skilled in the art. For example, the vulcanising agent may be sulfur. The amount of the vulcanising agent that the rubber compositions of the present invention comprises is not particularly limited, but may be from 0.1 to 5 parts by weight based on 100 parts by weight of the rubber component. For example, the rubber composition may comprise from 0.1 to 2 parts by weight, preferably 0.1 to 1 parts by weight, more preferably from 0.5 to 1 parts by weight, for example, 0.5, 0.6, 0.7, 0.8, 0.9 or 1 parts by weight based on 100 parts by weight of the rubber component.

The vulcanisation accelerator of the rubber compositions of present invention is not particularly limited and may be any of those known to the person skilled in the art. For example, the vulcanisation accelerator may be one or more selected from the group consisting of a thiazole type vulcanization accelerator such as 2-mercaptobenzothiazole (MBT), dibenzothiazyl disulfide (MBTS), N-cyclohexyl-2-benzothiazyl sulfenamide (CBS), and N-tert-butyl-2-benzothiazolyl sulfenamide (TBBS); a guanidine type vulcanization accelerator such as 1,3-diphenyl guanidine (DPG); a thiuram-based vulcanization accelerator such as tetramethyl thiuram disulphide, tetrabutyl thiuram disulfide, tetradodecyl thiuram disulfide, tetraoctyl thiuram disulfide, and tetrabenzyl thiuram disulfide; and dithiocarbamate compounds such as dimethyl dithiocarbamate zinc; and other dialkyl dithiophosphoric acid zinc. Preferably, the vulcanisation accelerator may be a combination of dibenzothiazyl disulfide (MBTS), N-cyclohexyl-2-benzothiazyl sulfenamide (CBS), and 1,3-diphenyl guanidine (DPG). The total amount of the vulcanisation accelerator is not particularly limited, but may be from 0.2 to 10 parts by weight based on 100 parts by weight of the rubber component, preferably from 0.5 to 8 parts by weight, preferably from 1 to 5 parts by weight, more preferably from 2 to 4 parts by weight, for example 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9 or 4 parts by weight based on 100 parts by weight of the rubber component. The amount of each vulcanisation accelerator may be from 0.1 to 5 parts by weight based on 100 parts by weight of the rubber component, preferably from 0.5 to 3 parts by weight, more preferably from 0.75 to 2 parts by weight, for example 0.8, 0.9, 1, 1.1, 1.2, 1.3, 1.4, 1.5, 1.6, 1.7, 1.8, 1.9, or 2 parts by weight based on 100 parts by weight of the rubber component. Preferably, the vulcanisation accelerator of the rubber compositions of the present invention may comprise dibenzothiazyl disulfide (MBTS) in an amount from 1 to 2 parts by weight, N-cyclohexyl-2-benzothiazyl sulfenamide (CBS) in the amount 0.75 parts by weight, and 1,3-diphenyl guanidine (DPG) in the amount 1.3 parts by weight based on 100 parts by weight of the rubber component.

The vulcanisation accelerator auxiliary of the present invention is not particularly limited and may be any of those known to the person skilled in the art. For example, the vulcanisation accelerator auxiliary may be zinc oxide (ZnO) and a fatty acid. The fatty acid may be any of saturated or unsaturated, or linear or branched fatty acid. The number of carbon atoms of the fatty acid is also not particularly limited, but may be from 1 to 30, or from 15 to 30. For example, the fatty acid may be one or more selected from the group consisting of cyclohexanoic acids (cyclohexane carboxylic acid), naphthenic acids having a side chain such as alkyl cyclopentane, saturated fatty acids such as hexanoic acid, octanoic acid, decanoic acid (including branched carboxylic acids such as neodecanoic acid), dodecanoic acid, tetradecanoic acid, hexadecanoic acid, and octadecanoic acid (stearic acid), unsaturated fatty acids such as methacrylic acid, oleic acid, linolic acid and linolenic acid, and resin acids such as rosin, tall oil acid and abietic acid. Preferably the vulcanisation accelerator auxiliary of the present invention is zinc oxide (ZnO) and stearic acid. The total amount of the vulcanisation accelerator auxiliary is not particularly limited, but may be from 1 to 10 parts by weight based on 100 parts by weight of the rubber component, for example 1.5 to 7 parts by weight, or 2 to 5 parts by weight, for example, 2, 2.5, 3, 3.5, 4, 4.5, or 5 parts. Preferably, zinc oxide (ZnO) is present in an amount of 2 parts by weight and stearic acid is present in an amount of 1.5 parts by weight based on 100 parts by weight of the rubber component.

The carbon black of the rubber compositions of the present invention is not particularly limited and may be any of those known to the person skilled in the art. The carbon black may be furnace black, channel blacks, and lamp blacks. For example, the carbon black may be one or more selected from the group consisting of super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be used include acetylene blacks. The carbon black may be in pelletized form or an unpelletized flocculent mass. A specific example of the carbon black in the rubber compositions of the present invention is CORAX® N234 by Orion Engineered Carbons. The amount of carbon black that the rubber compositions of the present invention comprises is not particularly limited, but may be from 0.1 to 10 parts by weight of the rubber component, for example from 0.5 to 5 parts by weight, or from 1 to 4 parts by weight, for example, 1, 2, 3, or 4 parts by weight based on 100 parts by weight of the rubber component. Preferably, the carbon black is present at 2 to 3 parts by weight based on 100 parts by weight of the rubber component.

Advantageously, the only silica-based filler that the rubber compositions of the present invention comprises is the functionalized silica discussed above. In other words, no additional silica may be present. However, the presence of additional silica-based fillers is not necessarily precluded from the present invention. Additional silica-based fillers may include any of those known to the person skilled in the art (not including the functionalized silica discussed above) including precipitated amorphous silica, wet silica (hydrated silicic acid), dry silica (anhydrous silicic acid), fumed silica, calcium silicate, aluminum silicate, magnesium silicate (e.g., $Mg_2SiO_4$, $MgSiO_3$), magnesium calcium silicate ($CaMgSiO_4$), aluminum calcium silicate (e.g., $Al_2O_3 \cdot CaO_2SiO_2$).

The rubber composition may comprise additional fillers known to the person skilled in the art. For example, the rubber compositions of the present invention may comprise one or more selected from the group consisting of aluminum hydroxide, talc, alumina ($Al_2O_3$), aluminum hydrate ($Al_2O_3H_2O$), aluminum hydroxide ($Al(OH)_3$), aluminum carbonate ($Al_2(CO_3)_2$), aluminum magnesium oxide ($MgOAl_2O_3$), pyrofilite ($Al_2O_3 \cdot 4SiO_2 \cdot H_2O$), bentonite ($Al_2O_3 \cdot 4SiO_2 \cdot 2H_2O$), mica, kaolin, glass balloon, glass beads, calcium oxide (CaO), calcium hydroxide ($Ca(OH)_2$), calcium carbonate ($CaCO_3$), magnesium carbonate, magnesium hydroxide ($Mg(OH)_2$), magnesium oxide (MgO), magnesium carbonate ($MgCO_3$), potassium titanate, barium sulfate, zirconium oxide ($ZrO_2$), zirconium hydroxide [$Zr(OH)_2 \cdot nH_2O$], zirconium carbonate [$Zr(CO_3)_2$], crystalline aluminosilicates, reinforcing grades of zinc oxide (i.e., reinforcing zinc oxide). The amount of the further fillers may be from 5 to 200 parts by weight based on 100 parts by weight of the rubber component, for example, 10 to 150 parts by weight, or 25 to 100 parts by weight based on 100 parts by weight of the rubber component.

The silane coupling agent of the rubber compositions of the present invention is not particularly limited and may be any of those known to the person skilled in the art. For example, the silane coupling agent of the present invention may be one or more selected from the group consisting of bis(3-triethoxysilylpropyl) tetrasulfide, bis(3-triethoxysilylpropyl) trisulfide, bis(3-triethoxysilylpropyl) disulfide, bis (2-triethoxysilylethyl) tetrasulfide, bis(3-trimethoxysilylpropyl) tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzothiazolyl tetrasulfide, 3-triethoxysilylpropylmethacrylate monosulfide, 3-trimethoxysilylpropylmethacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyl tetrasulfide, and dimethoxymethylsilylpropylbenzothiazolyl tetrasulfide. Preferably, the silane coupling agent is bis(3-triethoxysilylpropyl) tetrasulfide. A specific example of the silane coupling agent is Si 69® from Evonik Industries AG. The amount of the silane coupling agent is not particularly limited, but may be from 2 to 20 parts by weight based on 100 parts by weight of the rubber component, preferably from 5 to 15 parts by weight, preferably from 7 to 13 parts by weight, more preferably from 9 to 12 parts by weight, for example 9, 9.1, 9.2, 10.3, 9.4, 9.5, 9.6, 9.7, 9.8, 9.9, 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, or 12 parts by weight based on 100 parts by weight of the rubber component.

The oil of the rubber compositions of the present invention is not particularly limited and may be any of those known to the person skilled in the art. For example, the oil of the present invention may be one or more selected from the group consisting of processed oils such as aromatics oil, such as DAE (Distillate Aromatic Extract)-, Tdae (Treated Distillate Aromatic Extract)-, MES (Mild extraction solvate)-, RAE (Residual Aromatic Extract)-, Trae (Treated Residual Aromatic Extract)-, naphthenic and heavy naphthenic oils, paraffin oils, vegetable oils such as coconut oil, synthetic oils such as alkylbenzene oils and castor oils. Preferably, the oil is an aromatic oil, such as a residual aromatic extract oil. The oil of the rubber composition may be added in the rubber composition in the form of a polymer extender present in one or more polymers (e.g. the functionalized or non-functionalized SSBR co-polymers).

The total amount of oil in the rubber composition is calculated by the sum of the extender oil present in the one or more polymers and any additional oil components that may be present. The total amount of oil is not particularly limited but may be from 5 to 60 parts by weight based on 100 parts by weight of the rubber component, preferably from 8 to 50 parts by weight, preferably from 10 to 45 parts by weight, more preferably from 15 to 40 parts by weight, for example, 15, 16, 17, 18, 19, 20, 21, 22, 23, 24, 25, 26, 27, 28, 29 or 30 parts by weight based on 100 parts by weight of the rubber component.

The antidegradant of the rubber compositions of the present invention is not particularly limited and may be any of those known to the person skilled in the art. The antidegradant may be an antioxidant and/or and antiozonant. For example, the antidegradant may be one or more selected from the group consisting of N-(1,3-Dimethylbutyl)-N'-phenyl-p-phenylenediamine (6PPD) and 2,2,4-Trimethyl-1,2-Dihydroguinoline polymer (TMQ). Preferably, the antidegradant is a combination of N-(1,3-Dimethylbutyl)-N'-phenyl-p-phenylenediamine (6PPD) and 2,2,4-Trimethyl-1,2-Dihydroguinoline polymer (TMQ). The amount of each antidegradant may be from 0.1 to 3 parts by weight based on 100 parts by weight of the rubber component, for example, from 0.5 to 1.5 parts by weight, for example, 0.5, 0.6, 0.7, 0.8, 0.9, 1.0 parts by weight based on 100 parts by weight of the rubber component. The total amount of antidegradant may be from 0.1 to 10 parts by weight based on 100 parts by weight of the rubber component, preferably from 0.1 to 5 parts by weight, preferably from 0.5 to 3 parts by weight, more preferably from 1 to 2 parts by weight, for example, 1.1, 1.2, 1.3, 1.4, 1.5, 1.6, 1.7, 1.8, 1.9, or 2 parts by weight based on 100 parts by weight of the rubber component.

According to a further aspect, the present invention provides a method of producing a rubber compound by compounding the rubber composition of the present invention.

According to a further aspect, the present invention provides a method of producing a rubber product comprising the steps of: compounding the rubber composition of the present invention to form a rubber compound; forming the rubber compound into a desired shape; and, vulcanising the rubber compound.

Rubber Composition Production and Compounding

In preparing the rubber composition of the present invention, the method for combining each of the components is not limited and any of the methods known to the person skilled in the art may be used. For example, all of the component materials may be blended and kneaded at once or they may be blending and kneaded in multiple steps. For blending and kneading, a kneader such as roll kneader, internal mixer or Banbury mixer may be used. For moulding the rubber composition into sheet or strip shape, any known moulding machine such as extrusion moulding machine or press moulding machine may be used.

Vulcanisation

The vulcanization conditions for hardening the above rubber composition are not limited and can be any of those known to the person skilled in the art. Typically, however, vulcanization conditions of treatment at 140 to 180° C. for 5 to 120 minutes are employed.

Tire Production

The tire of the present invention is not specifically limited, except in that it is made using the rubber composition of the present invention, and may be appropriately selected depending on the intended purpose. Because the tire is made using the rubber compositions of the present invention, it has excellent wear resistance, rolling resistance, wet performance and toughness and outstanding balance between these properties.

The part of the tire in which the rubber composition of the present invention is used is not specifically limited and may be appropriately selected depending on the intended purpose. For example, the rubber composition may be used in the tread, base treads, side walls, side-reinforcing rubbers, bead fillers, etc. Among these, the rubber composition is advantageously used in the tread component.

Regarding the method for producing the tire, any method known to those skilled in the art can be used. For example, components generally used in tire production, such as a carcass layer, a belt layer, a tread layer and the like formed of at least one selected from the group consisting of an unvulcanised rubber composition and a cord are layered in order on a drum for tire formation and then the drum is removed to give a green tire. Next, the green tire is vulcanised under heat according to an ordinary method to produce a desired tire. The tire may be, for example, a pneumatic tire.

EXAMPLES

The invention will now be illustrated by means of the following examples, which are intended to explain the invention and in no way limit its scope.

Test Methods

Brunauer-Emmett-Teller (BET) specific surface area—The specific surface area of the functionalized silica was measured by the BET method according to the method described in the Journal of the American Chemical Society, Vol. 60, page 309, February 1938, and corresponding to standard NF ISO 5794-1, Appendix D (June 2010).

Cetyltrimethylammonium bromide (CTAB) adsorption method—The surface area of the functionalized silica was measured by the CTAB method according to ASTM D6845.

Carbon content (C) of carboxylic acid plus corresponding carboxylate—The content of carboxylic acid plus corresponding carboxylate, denoted (C), expressed as total carbon, may be measured using a carbon/sulfur analyser, such as the Horiba EMIA 320 V2 machine. The principle of the carbon/sulfur analyser is based on the combustion of a solid sample in a stream of oxygen in an induction furnace (adjusted to approximately 170 mA) and in the presence of combustion accelerators (approximately 2 g of tungsten (in particular Lecocel 763-266) and approximately 1 g of iron). The analysis lasts approximately 1 minute. The carbon present in the sample to be analysed (mass of approximately 0.2 g) combines with the oxygen to form $CO_2$ and CO. These decomposition gases are subsequently analysed by an infrared detector. The moisture from the sample and the water produced during these oxidation reactions is removed by passing through a cartridge comprising a dehydrating agent (magnesium perchlorate) so as not to interfere with the infrared measurement. The result is expressed as a mass percentage of element carbon.

Object size distribution width ratio Ld—The object size distribution width ratio is the object size distribution width ratio Ld ((d84−d16)/d50), measured by XDC particle size analysis after ultrasound deagglomeration according to the method described in WO 2015/121333 A1.

Pore volume distribution—The pore volume distribution is the pore volume distribution ratio V(d5−d50)/V(d5−d100) measured according to the method described in WO 2015/121333 A1.

Functionalized silica pH—the pH of the functionalized silica was measured according to the method described in WO 2015/121333 A1, which is derived from ISO 787/9.

Mooney viscosity—Mooney viscosity was measured on the raw functionalized or non-functionalized polymer according to the ASTM D1646 Standard.

Rolling Resistance (RR)—Rolling resistance was measured according to United Nations Regulation No. 117, Revision 4, 2016, Annex 6.

Wet Performance—Wet performance was measured according to United Nations Regulation No. 117, Revision 4, 2016, Annex 5.

Toughness (TB*EB)—The toughness measurement was based on the tensile properties of the compound according to International Organisation for Standardization (ISO) 5893 measured at 100° C.

Payne Effect (%)—The Payne Effect has been calculated from the compound dynamic properties measured according to the ISO 4664 standard, in the stress/strain test at room temperature. The Payne Effect can predict the filler dispersion in the rubber composition from the ratio (expressed in percentage) between ΔE'/E(0.1% strain), wherein the ΔE' is the difference between the E'(0.1% strain)−E'(4% strain). The lower the Payne Effect, the better the filler dispersion in the rubber composition. In Table 2 below, the Payne Effect data is presented relative to Comparative Example 1, for which the Payne Effect has been normalised to 100. A Payne Effect value of greater than 100 indicates that filler dispersion is improved compared to Comparative Example 1.

End-Group Functionalized SSBR Copolymer

In the following examples, the end-group functionalized SSBR copolymer was prepared according to Example 3 of WO 2014/173706 A1, as described below.

An inertized 20 litre reactor was charged with hexane (8.5 kg), 1,3-butadiene (1,185 g), styrene (315 g), 2,2-bis(2-tetrahydrofuryl)propane (8.6 mmol) and butyllithium (11.3 mmol), and the contents were heated to 60° C. Polymerization was effected while stirring at 60° C. for 25 minutes. Subsequently, an amount of hexamethylcyclotrisiloxane equimolar to that of butyllithium was added (as a solution in cyclohexane) and the reactor contents were then heated to 60° C. for a further 20 minutes to cap the anionic ends of the polymer chains. 20 minutes after addition of the hexamethylcyclotrisiloxane, an amount of 2,2-dimethyl-1-oxa-4-thia-2-silacyclohexan-6-one equimolar to that of butyllithium and hexamethylcyclotrisiloxane was added (as a solution in toluene) and the mixture was heated to 60° C. for a further 20 minutes. The rubber solution was discharged and stabilized by addition of Irganox® 1520 (2,4-bis(octylthiomethyl)-6-methylphenol) (3 g), and the solvent was removed by stripping with steam. The rubber crumbs were dried at 65° C. under reduced pressure.

Functionalized Silica

In the following examples, the functionalized silicas were prepared according to Example 6 in WO 2015/121333 A1, wherein the amount of methylglutaric acid (MGA) added was 0.40 wt % (expressed as MGA mixture/$SiO_2$ weight ratio) and the pH was adjusted to be between 3 and 3.7 for functionalized silica A, and the amount MGA added was 0.40 wt % (expressed as MGA mixture/$SiO_2$ weight ratio) and pH was adjusted to be between 3.5 and 4.2 for functionalized silica B.

The properties of Functionalized silica A and Functionalized silica B are shown in Table 1 below.

TABLE 1

| Property | Functionalized silica A | Functionalized silica B |
|---|---|---|
| BET surface area ($m^2/g$) | 286 | 288 |
| CTAB surface area ($m^2/g$) | 253 | 254 |
| pH | 3.7 | 4.1 |
| Carbon content | 0.15 | 0.15 |
| Object size distribution width ratio (Ld) | 1.11 | 1.36 |
| Pore volume distribution ratio | 0.71 | 0.71 |

Rubber Compositions

Tables 2 and 3 below show the rubber compositions of Examples 1 to 4 and Comparative Examples 1 to 3. The rubber compositions were prepared by compounding the components listed in Tables 2 and 3. Table 2 shows the polymer and silica components of the rubber compositions, while Table 3 shows the further components. The values given in Tables 2 and 3 are parts by weight based on 100 parts by weight of the rubber component (PHR). The amounts of the polymer components given in Table 2 (i.e. the amounts of non-functionalized SSBR, hydroxyl-functionalized SSBR and end-group functionalized SSBR copolymer) include the percentage amount of extender oil that is recited in the description of each polymer in column 2 of Table 2. That is, to calculate the amount of pure SSBR co-polymer present in the composition by weight based on 100 parts by weight of the rubber component, the value given in Table 2 should be adjusted to account for the percentage amount of extender oil present. The rubber compositions were subjected to the testing methods described above.

Table 2 additionally shows the viscoelastic properties of tires prepared from the rubber compositions Examples 1 to 4 and Comparative Examples 1 to 3. The results are presented relative to Comparative Example 1, for which all the values of the listed viscoelastic properties have been normalised to 100. Therefore, if the value of the viscoelastic property is greater than 100, an improvement in that property is indicated and, if the value of the viscoelastic property is less than 100, a reduction in that viscoelastic property is indicated. Where the value of the viscoelastic property is 100, then the result was the same as that for Comparative Example 1.

The "Balance" figure is the sum of the values of the viscoelastic properties for each composition minus 400. As the value of each of the four viscoelastic properties of Comparative Example 1 have been set at 100, the Balance of Comparative Example 1 is 0. A Balance of greater than 0 therefore indicates an improvement in the overall viscoelastic properties compared to Comparative Example 1.

The "Notes" summarise the characteristics of the polymer and silica components of each rubber composition.

TABLE 2

| | | Comparative Examples | | | Experimental Examples | | | |
|---|---|---|---|---|---|---|---|---|
| | | 1 | 2 | 3 | 1 | 2 | 3 | 4 |
| Component (PHR) | Non-functionalized SSBR (BUNA ® VSL 3038-2HM by Arlanxeo) Oil-extended with 27.3% of TDAE oil | 55.00 | 55.00 | 55.00 | 55.00 | 55.00 | 41.25 | 41.25 |
| | Hydroxyl-functionalized SSBR Oil-extended with 10% of TDAE oil | 65.40 | — | 65.40 | — | — | — | — |
| | End-group functionalized SSBR copolymer Oil-extended with 5% of TDAE oil | — | 63.20 | — | 63.20 | 63.20 | 73.50 | 73.50 |
| | Non-functionalized silica | 72.00 | 72.00 | — | — | — | — | — |
| | Functionalized silica A | — | — | 72.00 | 72.00 | — | 72.00 | 80.00 |
| | Functionalized silica B | — | — | — | — | 72.00 | — | — |
| Viscoelastic Properties | Wear Resistance | 100 | 103 | 105 | 113 | 106 | 108 | 121 |
| | Rolling Resistance | 100 | 100 | 104 | 107 | 105 | 107 | 103 |
| | Wet Performance | 100 | 100 | 102 | 103 | 103 | 104 | 100 |
| | TB*EB (Toughness) | 100 | 101 | 103 | 104 | 104 | 101 | 99 |
| | Balance | 0 | 4 | 14 | 27 | 18 | 20 | 23 |
| | Payne Effect | 100 | 100 | 107 | 118 | 105 | 110 | 107 |
| | Functionalized silica pH | | | 3.7 | 3.7 | 4.2 | 3.7 | 3.7 |

Notes to Comparative Examples (CE)

CE 1: No carboxyl functionalized components

CE 2: Carboxyl-functionalized SSBR, non-functionalized silica

CE 3: Hydroxyl-functionalized SSBR, carboxyl-functionalized silica

Notes to Experimental Examples (EE)

EE 1: Carboxyl-functionalized SSBR, carboxyl-functionalized silica

EE 2: Carboxyl-functionalized silica having higher pH (4.2 vs 3.7)

EE 3: Ratio of functionalized silica to functionalized polymer of less than 1

EE 4: Higher amount of functionalized silica

TABLE 3

| | | Comparative Examples | | | Experimental Examples | | | |
|---|---|---|---|---|---|---|---|---|
| | | 1 | 2 | 3 | 1 | 2 | 3 | 4 |
| Further Components in compositions (PHR) | Carbon black (Corax ® N234) | 2.00 | 2.00 | 2.00 | 2.00 | 2.00 | 2.00 | 3.00 |
| | Silane coupling agent (Si 69 ®) | 10.60 | 10.60 | 10.60 | 10.60 | 10.60 | 10.60 | 11.80 |
| | N-(1,3-Dimethylbutyl)-N'-phenyl-p-phenylenediamine (6PPD) | 1.60 | 1.60 | 1.60 | 1.60 | 1.60 | 1.60 | 1.60 |
| | 1,3-diphenyl guanidine (DPG) | 2.30 | 2.30 | 2.30 | 2.30 | 2.30 | 2.30 | 2.30 |
| | Residual Aromatic Extract (RAE) oil | 15.10 | 9.70 | 15.10 | 9.70 | 9.70 | 13.20 | 13.20 |
| | Sulfur | 0.80 | 0.80 | 0.80 | 0.80 | 0.80 | 0.80 | 0.60 |
| | Dibenzothiazyl disulfide (MBTS) | 1.50 | 1.50 | 1.50 | 1.50 | 1.50 | 1.50 | 1.75 |
| | N-cyclohexyl-2-benzothiazyl sulfenamide (CBS) | 0.70 | 0.70 | 0.70 | 0.70 | 0.70 | 0.70 | 0.70 |
| | Zinc Oxide | 2.00 | 2.00 | 2.00 | 2.00 | 2.00 | 2.00 | 2.00 |
| | Stearic Acid | 1.50 | 1.50 | 1.50 | 1.50 | 1.50 | 1.50 | 1.50 |
| | 2,2,4-Trimethyl-1,2-Dihydroquinoline polymer (TMQ) | 0.50 | 0.50 | 0.50 | 0.50 | 0.50 | 0.50 | 0.50 |

Results and Discussion

The Balance data for Experimental Examples 1 to 4 is significantly higher than that of Comparative Examples 1 to 3, demonstrating an overall improvement in the viscoelastic properties of tires prepared from compositions comprising both the end-group functionalized SSBR and the functionalized silica. Additionally, an interactive and/or synergistic effect is achieved by combining the end-group functionalized SSBR and the functionalized silica.

Comparing Comparative Example 3 with Experimental Examples 1 to 4, an improvement in the overall viscoelastic properties, in particular wear and rolling resistance, is achieved when the end-group functionalized SSBR is used when compared to a hydroxyl-functionalized polymer.

A comparison of Experimental Example 1 with Experimental Example 2 demonstrates that an improvement in the overall viscoelastic properties, in particular wear and rolling resistance, is achieved when the pH is 3.7 compared to 4.2.

As can be seen from a comparison of Experimental Example 1 with Experimental Example 3, an improvement in the overall viscoelastic properties, in particular wear and toughness, is achieved when the amount of the functionalized silica is greater than the amount of the end-group functionalized SSBR.

As can be seen from Experimental Example 4, a higher amount of the functionalized silica significantly improves the wear properties.

The invention claimed is:

1. A rubber composition comprising:

a rubber component comprising an end-group functionalised solution-polymerised styrene-butadiene (SSBR) copolymer, wherein the end-group functionalised SSBR copolymer comprises terminal carboxyl groups; and, a functionalised silica, wherein the functionalised silica is a silica functionalised with one or more carboxyl groups and has a pH ranging from 2.5 to 3.4, the functionalised silica having:

a BET specific surface area of from 250 to 310 $m^2/g$;

a CTAB specific surface area of from 230 to 285 $m^2/g$;

a carbon content of at least 0.10% by weight of the functionalised silica;

an object size distribution width ratio (Ld) of at least 0.91; and a pore volume distribution ratio of at least 0.65;

wherein the ratio of the amount of the functionalised silica in parts per hundred of the rubber component to the amount of the end-group functionalised SSBR copolymer in parts per hundred of the rubber component is from 1.1:1 to 2:1.

2. The rubber composition according to claim 1, wherein the end-group functionalised SSBR copolymer comprises terminal silane-containing carboxyl groups of Formula (I):

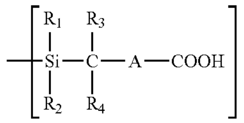

(I)

wherein:

$R_1$ and $R_2$ are the same or different and each independently a hydrogen, alkyl, alkoxy, cycloalkyl, cycloalkoxy, aryl, aryloxy, alkylaryl, alkylaryloxy, aralkyl, or aralkoxy radical;

$R_3$ and $R_4$ are the same or different and each independently a hydrogen, alkyl, cycloalkyl, aryl, alkaryl, or aralkyl radical; and, A is a divalent organic radical, comprising an alkyl radical or one or more heteroatoms selected from the group consisting of O, $NR_7$, S and $SiR_8R_9$.

3. The rubber composition according to claim 2, wherein the silane-containing carboxyl group is present as a carboxylate of the Formula (II):

(II)

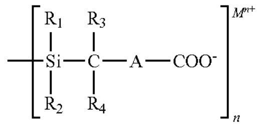

wherein:

$R_1$ and $R_2$ are the same or different and each independently a hydrogen, alkyl, alkoxy, cycloalkyl, cycloalkoxy, aryl, aryloxy, alkylaryl, alkylaryloxy, aralkyl, or aralkoxy radical;

$R_3$ and $R_4$ are the same or different and each independently a hydrogen, alkyl, cycloalkyl, aryl, alkaryl, or aralkyl radical; and, A is a divalent organic radical, comprising an alkyl radical or one or more heteroatoms selected from the group consisting of O, $NR_7$, S and $SiR_8R_9$; and, M is a metal or semi-metal of valency 1 to 4, selected from the group consisting of Li, Na, K, Mg, Ca, Zn, Fe, Co, Ni, Al, Nd, Ti, Sn, Si, Zr, V, Mo or W, wherein n is an integer from 1 to 4.

4. The rubber composition according to claim 1, wherein the end-group functionalised SSBR copolymer is obtainable by reaction of an SSBR copolymer with one or more functionalising reagents in the form of silalactones, wherein the silalactones are compounds of Formula (III):

(III)

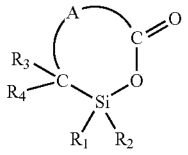

wherein $R_1$ and $R_2$ are the same or different and each independently a hydrogen, alkyl, alkoxy, cycloalkyl, cycloalkoxy, aryl, aryloxy, alkylaryl, alkylaryloxy, aralkyl, or aralkoxy radical;

$R_3$ and $R_4$ are the same or different and each independently a hydrogen, alkyl, cycloalkyl, aryl, alkaryl, or aralkyl radical; and A is a divalent organic radical, comprising an alkyl radical or one or more heteroatoms selected from the group consisting of O, $NR_7$, S and $SiR_8R_9$.

5. The rubber composition according to claim 2, wherein the silane-containing carboxyl group is bonded to the SSBR copolymer via one or more divalent structural elements of Formula (V):

(V)

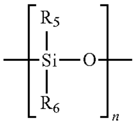

wherein n is an integer from 3 to 6, wherein $R_5$, $R_6$ are the same or different and are each independently a hydrogen, alkyl, cycloalkyl, aryl, alkaryl, or aralkyl radical comprising one or more heteroatoms, wherein the heteroatoms are O, N, S or Si, and wherein the divalent structural elements are derived from one or more cyclosiloxanes selected from group consisting of hexamethylcyclotrisiloxane, octamethylcyclotetrasiloxane, decamethylcyclopentasiloxane, and dodecamethylcyclohexasiloxane.

6. The rubber composition according to claim 1, wherein the functionalised silica is functionalised at its surface with one or more polycarboxylic acids, wherein the one or more polycarboxylic acids are one or more selected from the group consisting of adipic acid, succinic acid, ethylsuccinic acid, glutaric acid, methylglutaric acid, oxalic acid, and citric acid.

7. The rubber composition according to claim 1, wherein the functionalised silica has a carbon content of at least 0.15% by weight.

8. The rubber composition according to claim 1, wherein the functionalised silica has an object size distribution width ratio of at least 0.94.

9. The rubber composition according to claim 1, wherein the functionalised silica has a pore volume distribution ratio of at least 0.66.

10. The rubber composition according to claim 1, comprising:

10.5 to 100 parts by weight based on 100 parts by weight of the rubber component of the end-group functionalised SSBR copolymer; and 20 to 200 parts by weight based on 100 parts by weight of the rubber component of a functionalised silica.

11. The rubber composition according to claim 1, wherein the ratio of the amount of the functionalised silica in parts per hundred of the rubber component to the amount of the end-group functionalised SSBR copolymer in parts per hundred of the rubber component is from 0.5:1 to 2:1.

12. The rubber composition according to claim 5, wherein the silane-containing carboxyl group is bonded to the SSBR copolymer via one or more divalent structural elements derived from cyclosiloxanes of Formula (IV):

(IV)

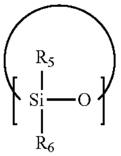

wherein $R_5$, $R_6$ are the same or different and are each independently a hydrogen, alkyl, cycloalkyl, aryl, alkaryl, or aralkyl radical comprising one or more heteroatoms, wherein the heteroatoms are O, N, S or Si, and wherein the divalent structural elements are derived from one or more cyclosiloxanes selected from group consisting of hexamethylcyclotrisiloxane, octamethylcyclotetrasiloxane, decamethylcyclopentasiloxane, and dodecamethylcyclohexasiloxane.

13. The rubber composition according to claim 2, wherein $R_1$ and $R_2$ further comprise one or more heteroatoms, wherein the heteroatoms are one or more selected from the group consisting of O, N, S, and Si;

$R_3$ and $R_4$ further comprise one or more heteroatoms, wherein the heteroatoms are one or more selected from the group consisting of O, N, S, and Si; and wherein A, the divalent organic radical, comprises an alkyl radical containing one or more heteroatoms, wherein the heteroatoms are one or more selected from the group consisting of O, $NR_7$, S, and $SiR_8R_9$.

14. The rubber composition according to claim 3, wherein $R_1$ and $R_2$ further comprise one or more heteroatoms, wherein the heteroatoms are one or more selected from the group consisting of O, N, S, and Si;

$R_3$ and $R_4$ further comprise one or more heteroatoms, wherein the heteroatoms are one or more selected from the group consisting of O, N, S, and Si; and wherein A, the divalent organic radical, comprises an alkyl radical containing one or more heteroatoms, wherein the heteroatoms are one or more selected from the group consisting of O, $NR_7$, S, and $SiR_8R_9$.

15. The rubber composition according to claim 4, wherein $R_1$ and $R_2$ further comprise one or more heteroatoms, preferably wherein the heteroatoms are one or more selected from the group consisting of O, N, S, and Si;

$R_3$ and $R_4$ further comprise one or more heteroatoms, preferably wherein the heteroatoms are one or more selected from the group consisting of O, N, S, and Si; and A, the divalent organic radical, comprises an alkyl radical containing one or more heteroatoms, preferably wherein the heteroatoms are one or more selected from the group consisting of O, $NR_7$, S, and $SiR_8R_9$.

16. A rubber composition comprising:

a rubber component comprising an end-group functionalised solution-polymerised styrene-butadiene (SSBR) copolymer, wherein the end-group functionalised SSBR copolymer comprises terminal carboxyl groups; and, a functionalised silica, wherein the functionalised silica is a silica functionalised with one or more carboxyl groups and has a pH ranging from 2.5 to 3.4, the functionalised silica having:

a BET specific surface area of from 250 to 310 $m^2/g$;

a CTAB specific surface area of from 230 to 285 $m^2/g$;

a carbon content of at least 0.10% by weight of the functionalised silica;

an object size distribution width ratio (Ld) of at least 0.91; and a pore volume distribution ratio of at least 0.65; and wherein the ratio of the amount of the functionalised silica in parts per hundred of the rubber component to the amount of the end-group functionalised SSBR copolymer in parts per hundred of the rubber component is from 0.5:1 to 0.75:1.

* * * * *